Figure 1:
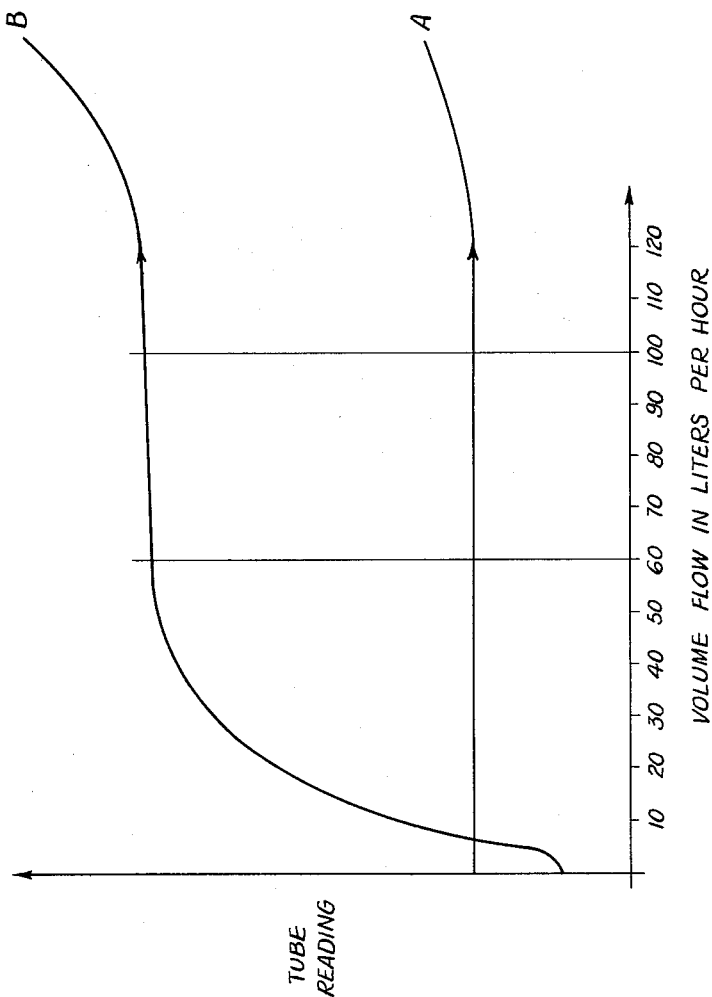

Dec. 14, 1965 K. GROSSKOPF 3,223,487
GAS DETECTION AND PUMP THEREFOR
Filed Aug. 15, 1962 2 Sheets-Sheet 1

INVENTOR
Karl Grosskopf
BY
Bailey, Stephens & Huettig
ATTORNEYS

United States Patent Office 3,223,487
Patented Dec. 14, 1965

3,223,487
GAS DETECTION AND PUMP THEREFOR
Karl Grosskopf, Bad Schwartau, Germany, assignor to
Otto Heinrich Dräger, Lubeck, Germany
Filed Aug. 15, 1962, Ser. No. 217,214
Claims priority, application Germany, Sept. 21, 1961,
D 37,080
2 Claims. (Cl. 23—254)

The present invention relates to the detection of gases by employing a detector tube together with a pump apparatus which is constructed in such a manner that changes in the gas flow velocity within a certain range through the assembly do not affect the analysis of the gases being detected.

So-called gas detection devices are known for determining the presence of specific constitutents in gases being analyzed, especially in air. These devices consist first of so-called detector tubes through which the gases to be analyzed are drawn. The presence of some constituents generally are indicated through a color change reaction. These detector tubes serve especially for determining toxic constituents in air.

The detector tubes of the most part consist of small transparent tubes which contain a detecting agent. This agent is generally deposited on granular products, or is in a liquid state contained in ampoules which are shattered before or after sampling of the gases to be analyzed. Fibrous substances or the like can be contained in the detector tubes for absorption when the reagent is a liquid. The detector tubes generally have interior diameters of about 5 to 8 millimeters.

The disadvantage in certain detection reactions employing detector tubes is that the color reading is dependent on the gas flow velocity through the detector tube of the gas to be analyzed. This disadvantage of being dependent upon volume flow is present, especially, in non-ionizing determination reactions.

The gas flow velocity mentioned herein can be measured in the simplest way as so-called volume flow, that is, the amount of gas for each unit of time, for example, liters per hour.

An object of this invention is to provide a process and apparatus which do not have the above disadvantages in detecting the presence of gases with the aid of detector tubes.

Accordingly, in this invention, the process for detecting constituents in gases lies in forcing or drawing the gas to be analyzed through a detector tube containing a color change reagent, the tube having an interior diameter of about 5 to 6 millimeters, at a volume flow rate of about 60 to 100 liters per hour. Surprisingly, it has been found that the indicator reaction proceeds in the same way throughout this range of high volume gas flow and, in a proportionally wide range, is no longer dependent on the gas flow velocity. This is even more unexpected as, in considering the detection reaction, clearly no sensitivity against variations in the gas flow velocity was to be expected with less gas flow velocity. Since the determination proceeds with secondary reactions, that is absorption and adsorption, it was to be expected that these reactions would not be sensitive against variations in the gas flow velocity with less gas flow velocity.

This invention further comprises an apparatus for carrying out the process according to this invention. This apparatus comprises a hand operatable gas detection pump in which the air displacement required is obtained by means of spring power. The pump is constructed in such a way, or the spring power is so calibrated, that with an air supply resistance of 100 Torr measured at 1 liter per minute, the pump produces an average volume gas flow of about 60 to 100 liters per hour. The most favorable gas flow velocity is obtained when this pump is combined with the known detector tubes, which generally posses an interior diameter of 5 to 8 millimeters, preferably about 5.5 millimeters.

It is suitable to construct the gas detection pump in such a way that it is provided with one or more compression springs, known per se, which alone or essentially accomplish the inflating action. This construction has the advantage that the gas detection pump is not dependent on the incidental construction of, for example, the material of the pump bellows which has an influence on the spring power that actuates the pump.

Figure 2:
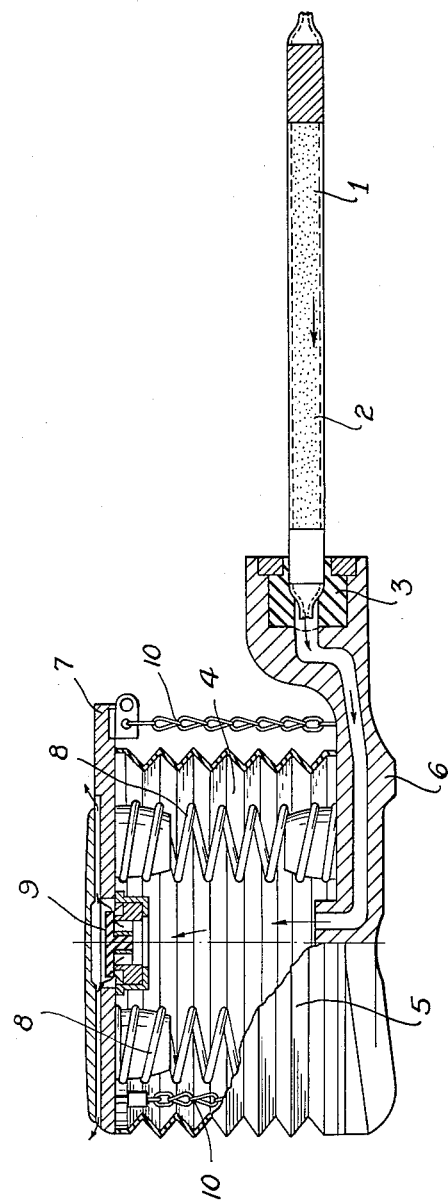

The means by which the objects of the invention are obtained are described more fully with reference to the accompanying drawings in which:

FIGURE 1 is a graph illustrating detector tube readings in which the volume flow in liters per hour is presented on the abscissa and the coloration in the detector tube presented on the ordinate; and FIGURE 2 is a cross-sectional view of the gas detection pump coupled with the detector tube.

In all cases in FIGURE 1, it was assumed that the gas to be analyzed was homogeneous and contained the same constituents in the same concentrations. Further, it was assumed that the detector tubes employed were of the same design, but with different detector reagents.

On the curve A, the tube readings, that is the length of the colored zone in the detector tube, were recorded assuming ideal reaction conditions. These ideal conditions, however, are fulfilled only when employing certain determination reactions, that is the ionizing determination reactions. For example, a pure ionization determination reaction occurs in determining hydrogen sulphide with the help of copper chloride, copper nitrate, or mercury (II) cyanide.

Curve A was compiled, for example, employing a detector tube which contained a composition comprising 80 milligrams of lead acetate, impregnated on 100 grams of silica gel, and 10 milligrams of mercury (II) cyanide. A layer of this preparation 70 millimeters long was placed in the detector tube. $H_2S$ concentrations between 1 and 60 parts per million were determined employing 1 liter amounts of gas to be analyzed. As shown by the resulting curve A, the indicator was independent of volume flow between 5 and 100 liters per hour. That is, the length of the ordinate remains constant even though the velocity of the gas flow varies.

Curve B also shows the coloration of detector tubes through which the gas to be analyzed was drawn with variable flow velocity. However, curve B was compiled by analyzing gases containing non-ionizing components, such as nitrous gases. As an example, curve B was compiled employing a detector tube which contained a composition comprising 10 milligrams of diphenylbenzidine, impregnated on 100 grams of silica gel, and 0.2 milliliter of glacial acetic acid. A layer of this preparation 70 millimeters long was placed in the detector tube. Nitrous compound concentrations between 0.5 and 10 parts per million were determined employing ½ liter amounts of the gas analyzed. As shown in curve B, the indicator was independent of volume flow between 60 and 90 liters per hour, while below 60 liters per hour the colored zone decreased with decreased volume flow and above 100 liters per hour the color zone lengthened with increased volume flow. It can be seen from curve B that in the range of volume gas flow of about 60 to 100 liters per hour, the reaction is practically independent of, or negligibly dependent on the gas flow velocity The usable reaction zone thus depends on the gas flow velocity extending between certain lower and higher flow velocities.

Referring to FIGURE 2, the detector tube 1 contains, for example, a granular carrier 2 and has an interior diameter of about 5.5 millimeters. The detector tube is installed in the mouthpiece 3 in the pump head of the gas detector pump 4. The gas detector pump 4 consists essentially of a bellows 5, a bottom 6, a cover plate 7, and compression springs 8 extending therebetween. The extent of outward expansion of bellows 5 is limited by chains 10 joining bottom 6 and cover plate 7.

In operating the pump, it is taken in one hand, for example, by laying the palm surface on the bottom 6 and the fingers on the cover 7. By compressing the pump, the air escapes from check valve 9 which stays open until the pump is fully compressed. After release, the pump draws the gas to be analyzed through the detector tube 1 whereupon the valve 9 closes.

The pump, for example, has a capacity of 100 cubic centimeters. It is constructed and the springs 8 are calibrated such that with an air supply resistance of 100 units of pressure, each unit being as previously defined, from the detector tube 1, the pump produces an average volume gas flow of from about 60 to 100 liters per hour.

Having now described the means by which the objects of the invention are obtained, I claim:

1. In a hand operatable gas detection pump for determining constituents in gases by drawing the desired volume of gas to be analyzed through a detector tube having an inside diameter of about 5 to 8 millimeters, the improvement comprising spring-actuated bellows means for drawing the desired volume of gas through said detector tube at a volume gas flow rate of about from 60 to 100 liters per hour, and said tube having a gas supply resistance of 100 Torr measured at one liter per minute.

2. In a gas detection pump for determining constituents in gases by drawing the desired volume of gas to be analyzed through a detector tube having an inside diameter of about 5 to 8 millimeters, the improvement comprising compression spring means for expanding the pump after compression for drawing the desired volume of gas through said detector tube at a volume gas flow rate of about 60 to 100 liters per hour, and said tube having a gas supply resistance of 100 Torr measured at one liter per minute.

References Cited by the Examiner

UNITED STATES PATENTS

| 2,487,077 | 11/1949 | Shepherd | 23—232 |
| 3,025,142 | 3/1962 | Williams | 23—232 |

FOREIGN PATENTS

| 1,007,523 | 5/1957 | Germany. |

MORRIS O. WOLK, *Primary Examiner.*
DELBERT E. GANTZ, *Examiner.*